April 25, 1944.  E. KOMENDA  2,347,566
LAMINATED BODY
Filed May 13, 1939
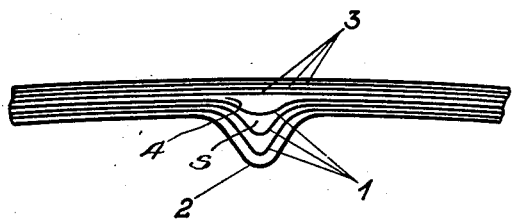
Inventor
ERWIN KOMENDA
By
Attorneys Patented Apr. 25, 1944

2,347,566

UNITED STATES PATENT OFFICE 2,347,566

LAMINATED BODY

Erwin Komenda, Stuttgart-Korntal, Germany; vested in the Alien Property Custodian Application May 13, 1939, Serial No. 273,397
In Germany May 14, 1938

2 Claims. (Cl. 154—45.9)

This invention relates to a laminated body, and more particularly to the construction of a vehicle body formed of laminated sheets of artificial material.

An object of this invention is the provision of a novel sheet of laminated artificial material.

A further object of this invention is to provide an improved ribbed sheet of laminated artificial material.

Another object of this invention is the provision of an improved ribbed vehicle body part formed of laminated artificial material.

Still another object of this invention is to provide a novel roof structure for a vehicle body formed of laminated artificial material.

An additional object of this invention is to provide a roof structure for a vehicle body formed of laminated artificial material with integral strengthening ribs or mouldings.

A more specific object of this invention is the provision of a ribbed roof structure for vehicle bodies of laminated artificial material, wherein the said ribs or edges are made as an integral continuation of at least a part of the laminations of the main roof structure.

Other objects will become apparent from the following description taken in connection with the attached drawing showing an illustrative embodiment of the invention, and wherein:

The single figure is a cross-sectional view through the central part of a vehicle roof, showing a preferred embodiment of my invention.

In the embodiment of this invention illustrated in the drawing which shows a longitudinal central cross-sectional view of a portion of a vehicle roof formed of laminated artificial material, there is illustrated the manner in which a part of the longitudinally extending laminations 1 are deformed in non-parallel undulations, with spaces S therebetween, to form a transverse strengthening rib 2, while the remaining laminations 3 extend continuously without deformation to form the remainder of the roof structure. It will be noted that aside from the position of the rib 2, the laminated roof structure is not altered, and that those parts of the laminations 1 which form the rib 2 are merely integral curved portions of the remainder of the laminated roof structure.

The laminated sheet forming the roof structure may be made in any manner known to the art, such, for example, as from super-imposed layers 1 and 3 of paper or fabric with layers 4 of a phenol resin, which has been heated and pressed together to form a laminated integral mass the phenol resin filling the spaces S between the undulations of the laminations 1. Instead of a phenol resin, cellulose, thiourea and similar compounds could readily be used.

The formation of a transverse or strengthening rib for a vehicle roof in the manner described above, adds materially to the rigidity of the roof, as contrasted with other types of ribbing which have heretofore been used and proposed to form a desired strengthening rib by adding supplemental transverse strips of laminations to the laminated body before heat and pressure have been applied, whereupon the artificial material acts to bind the added lamination through the rest of the sheet. It has also been proposed to add ribs consisting solely of the artificial material without laminations. In neither of these cases do the ribs contribute toward really increasing the rigidity of the structure, while at the same time are easily broken, as for example, in a collision. Such breaking results in producing a large number of splinters, which is extremely dangerous. Since, in the present case, the ribs are merely a continuation of the laminations of the main part of the roof they not only produce a desired strengthening action, but will not burst and splinter in case of collision.

Obviously, the principles of this invention are capable of many applications. For example, the ribs can be formed of laminated sheets of material which have been folded several times so that broad ribs and mouldings of still greater strength will result. While the invention is particularly adaptable in the production of vehicle body parts, it may find use in the formation of other parts, particularly involving those of difficult shape. In all cases, however, this will result in a part having extremely high rigidity and strength in all directions, and one which is not easily splintered upon impacts.

Accordingly, while I have herein shown and described only one embodiment of certain features of my present invention, it is to be understood that it is to be regarded merely as illustrative, and that I do not intend to limit myself thereto except as may be required by the following claims.

I claim:

1. A laminated structure composed of a plurality of sheets of flexible material and a plurality of layers of adhesive material interposed between adjacent sheets, a rib being protruded from one surface of said structure transversely thereof, and formed by non-parallel undulations of certain of said sheets, forming spaces between the portions of the sheets in the rib, the spaces being filled with the adhesive material.

2. A laminated structure composed of a plurality of sheets of flexible material and a plurality of layers of adhesive material interposed between adjacent sheets, certain of the sheets being constantly parallel throughout their entire length, the remaining sheets being parallel through a plurality of portions of their length, and having portions between said parallel portions in which they are disposed in non-parallel undulations forming intervening spaces therebetween, the spaces being filled with the adhesive material, and each portion of said structure formed by the undulations constituting a rib protruded transversely from the body of the structure.

ERWIN KOMENDA.